(12) United States Patent
Minegishi et al.

(10) Patent No.: US 8,683,244 B2
(45) Date of Patent: Mar. 25, 2014

(54) CONTROL APPARATUS AND CONTROL METHOD FOR VEHICLE

(75) Inventors: Shinichiro Minegishi, Toyota (JP); Masashi Yoshimi, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 535 days.

(21) Appl. No.: 13/120,210

(22) PCT Filed: Nov. 21, 2008

(86) PCT No.: PCT/JP2008/071225
§ 371 (c)(1), (2), (4) Date: Mar. 22, 2011

(87) PCT Pub. No.: WO2010/058479
PCT Pub. Date: May 27, 2010

(65) Prior Publication Data
US 2011/0173469 A1    Jul. 14, 2011

(51) Int. Cl.
G06F 1/26    (2006.01)

(52) U.S. Cl.
USPC .......................................... 713/320; 320/130

(58) Field of Classification Search
USPC ............... 713/320, 321, 340; 320/126, 130, 320/133–136
See application file for complete search history.

(56) References Cited

U.S. PATENT DOCUMENTS

| | | | |
|---|---|---|---|
| 5,883,496 A * | 3/1999 | Esaki et al. | 320/132 |
| 8,143,855 B2 * | 3/2012 | Davis | 320/126 |
| 2007/0018613 A1 * | 1/2007 | Miyazaki et al. | 320/116 |
| 2007/0219670 A1 * | 9/2007 | Tanaka et al. | 700/295 |
| 2008/0053715 A1 * | 3/2008 | Suzuki et al. | 180/2.1 |
| 2010/0044131 A1 * | 2/2010 | Teraya | 180/65.265 |

FOREIGN PATENT DOCUMENTS

| | | |
|---|---|---|
| JP | 8-251714 A | 9/1996 |
| JP | 2004-359032 A | 12/2004 |
| JP | 2006-182272 A | 7/2006 |
| JP | 2008-005657 A | 1/2008 |
| JP | 2008-109840 A | 5/2008 |
| JP | 2008-187884 A | 8/2008 |

OTHER PUBLICATIONS

Intelligent Charge and Discharge Control for Secondary Battery Cells, Jeon et al., Mar. 2009.*

* cited by examiner

*Primary Examiner* — Khanh Dang
(74) *Attorney, Agent, or Firm* — Kenyon & Kenyon LLP

(57) ABSTRACT

A vehicle equipped with a power source system including a master power source and a slave power source connected in parallel to a motor for running is provided. In a case where distribution of discharge power of the master power source and discharge power of the slave power source cannot be controlled, when a voltage difference between the respective power sources is greater than or equal to a certain value, an ECU sets a limit value on electric power supplied from the power source system to the motor at allowable discharge power of one of the power sources having a higher voltage, and limits a motor torque such that electric power discharged from the power source system to the motor does not exceed the set limit value.

8 Claims, 4 Drawing Sheets

CONTROL APPARATUS AND CONTROL METHOD FOR VEHICLE

This is a 371 national phase application of PCT/JP2008/071225 filed 21 Nov. 2008, the content of which is incorporated herein by reference.

TECHNICAL FIELD

The present invention relates to charge/discharge control in a vehicle equipped with a load consuming electric power and with a plurality of power sources, each being electrically connected in parallel to the load.

BACKGROUND ART

Japanese Patent Laying-Open No. 2008-109840 (Patent Document 1) discloses a power source system that can utilize system performance to a maximum degree even when a plurality of power storage devices have different charge/discharge properties. This power source system includes a plurality of power storage devices and a plurality of converters corresponding to the plurality of power storage devices, respectively. In this power source system, dischargeable remaining amounts of electric power are calculated for the respective power storage devices, and a distribution ratio of discharge power from the plurality of power storage devices is calculated in accordance with the ratio of the remaining amounts of electric power. When a load device is fed from the power source system, the plurality of converters are controlled in accordance with the calculated distribution ratio. This prevents any of the power storage devices from reaching a discharge limit faster than the remaining power storage devices. Accordingly, an opportunity at which the maximum discharge property can be obtained from the whole power source system is maximized. This in turn allows the performance of the power source system to be exerted to a maximum degree even when the plurality of power storage devices have different charge/discharge properties.

Patent Document 1: Japanese Patent Laying-Open No. 2008-109840
Patent Document 2: Japanese Patent Laying-Open No. 2006-182272

DISCLOSURE OF THE INVENTION

Problems to be Solved by the Invention

When a vehicle that runs with electric power from a power source system including a plurality of power sources and a plurality of converters corresponding to the plurality of power sources, respectively, is caused to run with the converters being shut down due to a failure or the like, distribution of discharge power of the respective power sources cannot be controlled, so that merely electric power of a power source having a higher voltage is mainly consumed in the case where the respective power sources are connected in parallel to a motor. This in turn raises a concern for overdischarge of the respective power sources. However, the above-mentioned Japanese Patent Laying-Open Nos. 2008-109840 and 2006-182272 never disclose charge/discharge control when the distribution of discharge power of the respective power sources cannot be controlled.

The present invention has been made to solve the above problems. An object of the present invention is to provide a control apparatus and a control method for a vehicle equipped with a load consuming electric power and with first and second power sources, each being electrically connected in parallel to the load, wherein the respective power sources can be prevented from being overdischarged even when the distribution of discharge power of the respective power sources cannot be controlled.

Means for Solving the Problems

A control apparatus according to the present invention controls a vehicle equipped with a load consuming electric power and with a first power source and a second power source, each being electrically connected in parallel to the load. This control apparatus includes: a setting unit for setting a limit value on electric power supplied to the load based on a state of the first power source and a state of the second power source; and a limiting unit for limiting the electric power supplied to the load in accordance with the limit value. The setting unit includes: a calculation unit for calculating a first upper limit value of electric power which is dischargeable from the first power source based on the state of the first power source and calculating a second upper limit value of electric power which is dischargeable from the second power source based on the state of the second power source; and a basic setting unit for selecting an upper limit value corresponding to one of the first power source and the second power source having a higher output voltage when a difference between output voltages of the first power source and the second power source is greater than a predetermined value, and selecting a smaller one of the first upper limit value and the second upper limit value when the difference between the output voltages is smaller than the predetermined value, thereby setting the limit value.

Preferably, the setting unit further includes a changing unit for selecting the limit value at a first time point in place of the upper limit value selected by the basic setting unit at a second time point later than the first time point, when the upper limit value selected by the basic setting unit at the second time point is greater than the limit value at the first time point, thereby setting the limit value at the second time point.

More preferably, the setting unit further includes a changing unit for selecting a smaller one of the first upper limit value and the second upper limit value in place of the upper limit value selected by the basic setting unit, when discharge power of the first power source exceeds the first upper limit value continuously for a certain duration of time or when discharge power of the second power source exceeds the second upper limit value continuously for the certain duration of time, thereby setting the limit value.

More preferably, the setting unit further includes a changing unit for selecting a smaller one of the first upper limit value and the second upper limit value in place of the upper limit value selected by the basic setting unit, when the output voltage of the first power source drops below a first predetermined value or when the output voltage of the second power source drops below a second predetermined value, thereby setting the limit value.

More preferably, the load includes a rotating electric machine. The vehicle is equipped with: a first converter disposed between the rotating electric machine and the first power source and controlled to take one of an operating state of performing a voltage conversion between the rotating electric machine and the first power source and a shutdown state of flowing current merely in a direction from the first power source to the rotating electric machine without performing the voltage conversion; a second converter disposed between the rotating electric machine and the second power source and controlled to take one of the operating state of performing the voltage conversion between the rotating electric machine and the second power source and the shutdown state of flowing current merely in a direction from the second power source to the rotating electric machine without performing the voltage conversion; and an inverter disposed among the first converter, the second converter and the rotating electric machine, for controlling the rotating electric machine. The control apparatus further includes a running control unit for, when a predetermined condition is satisfied, executing discharge running control of causing the vehicle to run by controlling the first converter and the second converter to take the shutdown state and by controlling the inverter such that the rotating electric machine operates as a motor without operating as a generator. When the discharge running control is executed, the setting unit sets the limit value. When the discharge running control is executed, the torque limiting unit limits an output torque of the rotating electric machine such that electric power supplied to the rotating electric machine does not exceed the limit value.

A control apparatus according to another aspect of the present invention controls a vehicle equipped with a rotating electric machine and with a first power source and a second power source, each being electrically connected in parallel to the rotating electric machine. The vehicle is equipped with a first converter for performing a voltage conversion between the rotating electric machine and the first power source, a second converter for performing the voltage conversion between the rotating electric machine and the second power source, and an inverter disposed among the first converter, the second converter and the rotating electric machine, for controlling the rotating electric machine. The first converter and the second converter, in a shutdown state, flow current merely in discharge directions from the first power source and the second power source to the rotating electric machine, respectively. The control apparatus includes: a running control unit for, when a predetermined condition is satisfied, executing discharge running control of causing the vehicle to run by controlling the first converter and the second converter to take the shutdown state and by controlling the inverter such that the rotating electric machine operates as a motor without operating as a generator; a setting unit for, when the discharge running control is executed, setting a limit value on electric power supplied to the rotating electric machine based on a state of the first power source and a state of the second power source; and a torque limiting unit for, when the discharge running control is executed, limiting an output torque of the rotating electric machine such that electric power supplied to the rotating electric machine does not exceed the limit value. The setting unit includes: a calculation unit for calculating a first upper limit value of electric power which is dischargeable from the first power source based on the state of the first power source and calculating a second upper limit value of electric power which is dischargeable from the second power source based on the state of the second power source; a basic setting unit for selecting an upper limit value corresponding to one of the first power source and the second power source having a higher output voltage, when a difference between output voltages of the first power source and the second power source is greater than a predetermined value, and selecting a smaller one of the first upper limit value and the second upper limit value when the difference between the output voltages is smaller than the predetermined value, thereby setting the limit value; a first changing unit for selecting a smaller one of the first upper limit value and the second upper limit value in place of the upper limit value selected by the basic setting unit, when discharge power of the first power source exceeds the first upper limit value continuously for a certain duration of time or when discharge power of the second power source exceeds the second upper limit value continuously for the certain duration of time, thereby setting the limit value; a second changing unit for selecting a smaller one of the first upper limit value and the second upper limit value in place of the upper limit value selected by the basic setting unit, when the output voltage of the first power source drops below a first predetermined value or when the output voltage of the second power source drops below a second predetermined value, thereby setting the limit value; and a third changing unit for selecting the limit value at a first time point in place of the upper limit value selected at a second time point later than the first time point, when the upper limit value selected at the second time point by one of the basic setting unit, the first changing unit and the second changing unit is greater than the limit value set at the first time point, thereby setting the limit value at the second time point.

A control method according to another aspect of the present invention is executed by a control apparatus for a vehicle equipped with a load consuming electric power and with a first power source and a second power source, each being electrically connected in parallel to the load. This control method includes the steps of: setting a limit value on electric power supplied to the load based on a state of the first power source and a state of the second power source; and limiting the electric power supplied to the load in accordance with the limit value. The step of setting the limit value includes the steps of: calculating a first upper limit value of electric power which is dischargeable from the first power source based on the state of the first power source and calculating a second upper limit value of electric power which is dischargeable from the second power source based on the state of the second power source; and selecting an upper limit value corresponding to one of the first power source and the second power source having a higher output voltage when a difference between output voltages of the first power source and the second power source is greater than a predetermined value, and selecting a smaller one of the first upper limit value and the second upper limit value when the difference between the output voltages is smaller than the predetermined value, thereby setting the limit value.

A control method according to still another aspect of the present invention is executed by a control apparatus for a vehicle equipped with a rotating electric machine and with a first power source and a second power source, each being electrically connected in parallel to the rotating electric machine. The vehicle is equipped with a first converter for performing a voltage conversion between the rotating electric machine and the first power source, a second converter for performing the voltage conversion between the rotating electric machine and the second power source, and an inverter disposed among the first converter, the second converter and the rotating electric machine, for controlling the rotating electric machine. The first converter and the second converter, in a shutdown state, flow current merely in discharge directions from the first power source and the second power source to the rotating electric machine, respectively. The control method includes the steps of: when a predetermined condition is satisfied, executing discharge running control of causing the vehicle to run by controlling the first converter and the second converter to take the shutdown state and by controlling the inverter such that the rotating electric machine operates as a motor without operating as a generator; when the discharge running control is executed, setting a limit value on electric power supplied to the rotating electric machine based on a state of the first power source and a state of the second power source; and when the discharge running control is executed, limiting an output torque of the rotating electric machine such that electric power supplied to the rotating electric machine does not exceed the limit value. The step of setting the limit value includes the steps of: calculating a first upper limit value of electric power which is dischargeable from the first power source based on the state of the first power source and calculating a second upper limit value of electric power which is dischargeable from the second power source based on the state of the second power source; selecting an upper limit value corresponding to one of the first power source and the second power source having a higher output voltage when a difference between output voltages of the first power source and the second power source is greater than a predetermined value, and selecting a smaller one of the first upper limit value and the second upper limit value as a basic value when the difference between the output voltages is smaller than the predetermined value, thereby setting the limit value; changing the basic value to a first change value which is a smaller one of the first upper limit value and the second upper limit value, when discharge power of the first power source exceeds the first upper limit value continuously for a certain duration of time or when discharge power of the second power source exceeds the second upper limit value continuously for the certain duration of time, thereby setting the limit value; changing the basic value to a second change value which is a smaller one of the first upper limit value and the second upper limit value, when the output voltage of the first power source drops below a first predetermined value or when the output voltage of the second power source drops below a second predetermined value, thereby setting the limit value; and selecting the limit value at a first time point as the limit value at a second time point later than the first time point, when one of the basic value, the first change value and the second change value at the second time point is greater than the limit value set at the first time point, thereby setting the limit value at the second time point.

Effects of the Invention

According to the present invention, the respective power sources can be prevented from being overdischarged even when the distribution of discharge power of the respective power sources cannot be controlled.

DESCRIPTION OF THE REFERENCE SIGNS

Figure 1:
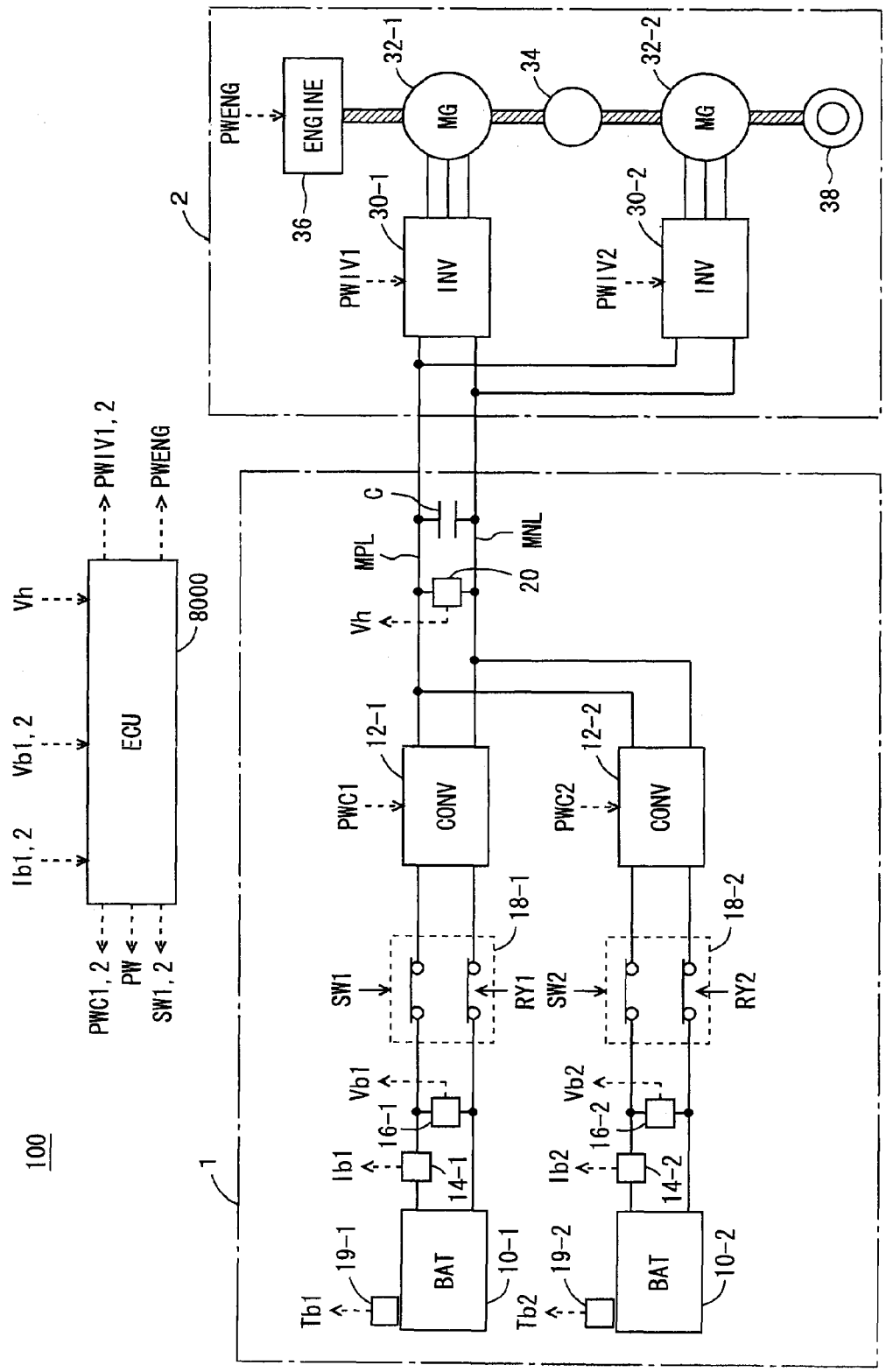
FIG. 1 is an overall block diagram of a vehicle equipped with a control apparatus according to an embodiment of the present invention.

1 power source system; 2 driving-force generating unit; 10-1 first power storage device (master power source); 10-2 second power storage device (slave power source); 12-1, 12-2 converter; 14-1, 14-2 current sensor; 16-1, 16-2, 20 voltage sensor; 18-1, 18-2 switching device; 19-1, 19-2 temperature sensor; 30-1, 30-2 inverter; 32-1, 32-2 MG; 34 power split device; 36 engine; 38 driven wheel; 100 vehicle; 8000 ECU; 8100 input interface; 8200 arithmetic processing unit; 8210 running control unit; 8220 setting unit; 8222 basic setting unit; 8223 first changing unit; 8224 second changing unit; 8225 third changing unit; 8230 torque limiting unit; 8300 memory unit; 8400 output interface; C, C1 smoothing capacitor; D1A, D1B diode; L1 reactor; Q1A, Q1B switching element; RY1, RY2 system relay.

BEST MODES FOR CARRYING OUT THE INVENTION

Hereinafter, an embodiment of the present invention will be described in detail with reference to the drawings. In the following, the same or corresponding portions have the same reference characters allotted, and detailed description thereof will not be repeated.

FIG. 1 is an overall block diagram of a vehicle according to an embodiment of the present invention. With reference to FIG. 1, vehicle 100 includes a power source system 1, a driving-force generating unit 2 and an ECU (Electronic Control Unit) 8000.

Driving-force generating unit 2 includes a first inverter 30-1, a second inverter 30-2, a first MG (Motor-Generator) 32-1, a second MG 32-2, a power split device 34, an engine 36, and a driven wheel 38.

First MG 32-1, second MG 32-2 and engine 36 are coupled to power split device 34. Vehicle 100 runs with a driving force from at least one of engine 36 and second MG 32-2.

Motive power generated by engine 36 is split by power split device 34 into two paths. More specifically, one is a path for transmission to driven wheel 38, and the other is a path for transmission to first MG 32-1.

Each of first MG 32-1 and second MG 32-2 is an AC rotating electric motor, and implemented by, for example, a three-phase AC rotating electric motor with permanent magnets embedded in a rotor. First MG 32-1 generates electric power using motive power of engine 36 split by power split device 34. The electric power generated by first MG 32-1 is supplied to power source system 1.

Second MG 32-2 generates a driving force using at least one of the electric power supplied from power source system 1 and the electric power generated by first MG 32-1. The driving force generated by second MG 32-2 is transmitted to driven wheel 38. During braking of the vehicle or the like, second MG 32-2 is driven by driven wheel 38, so that second MG 32-2 operates as a generator. Second MG 32-2 thereby operates as a regenerative brake for converting braking energy into electric power. The electric power generated by second MG 32-2 is supplied to power source system 1.

Power split device 34 is implemented by a planetary gear including a sun gear, a pinion gear, a carrier, and a ring gear. The pinion gear engages with the sun gear and the ring gear. The carrier supports the pinion gear so as to be rotatable on its own axis, and is coupled to the crankshaft of engine 36. The sun gear is coupled to the rotation shaft of first MG 32-1. The ring gear is coupled to the rotation shaft of second MG 32-2.

First inverter 30-1 and second inverter 30-2 are connected to a main positive bus line MPL and a main negative bus line MNL. First inverter 30-1 and second inverter 30-2 convert driving power (DC power) supplied from power source system 1 into AC power for output to first MG 32-1 and AC power for output to second MG 32-2, respectively. Also, first inverter 30-1 and second inverter 30-2 convert AC power generated by first MG 32-1 and AC power generated by second MG 32-2 into DC power, respectively, for output to power source system 1.

Each of first inverter 30-1 and second inverter 30-2 is implemented by, for example, a bridge circuit including three-phase switching elements. The inverters perform switching operations in response to driving signals PWIV1 and PWIV2 from ECU 8000, respectively, to thereby drive corresponding MGs.

ECU 8000 calculates a vehicle demand power Ps based on detection signals of respective sensors not shown, a running state, an accelerator pedal position, and the like to calculate target torque values and target speed values of first MG 32-1 and second MG 32-2, based on the calculated vehicle demand power Ps. ECU 8000 then controls first inverter 30-1 and second inverter 30-2 such that first MG 32-1 and second MG 32-2 have target values of generated torque and speed.

Power source system 1 includes a first power storage device 10-1, a second power storage device 10-2, a first converter 12-1, a second converter 12-2, a first switching device 18-1, a second switching device 18-2, main positive bus line MPL, main negative bus line MNL, a smoothing capacitor C, current sensors 14-1, 14-2, voltage sensors 16-1, 16-2, and temperature sensors 19-1, 19-2.

Each of first power storage device 10-1 and second power storage device 10-2 is, for example, a DC power source with a plurality of nickel-metal hydride, lithium ion or similar battery cells being connected in series.

First power storage device 10-1 is connected to first converter 12-1, while second power storage device 10-2 is connected to second converter 12-2.

First switching device 18-1 is disposed between first power storage device 10-1 and first converter 12-1 to switch an electric connection state between first power storage device 10-1 and first converter 12-1 in accordance with a switching signal SW1 from ECU 8000. More specifically, first switching device 18-1 includes a system relay RY1. When switching signal SW1 is deactivated, system relay RY1 is turned off, and when switching signal SW1 is activated, system relay RY1 is turned on. It should be noted that switching signal SW1 is activated when a user turns on an ignition switch not shown. In other words, system relay RY1 is maintained in an on state while vehicle 100 is running.

Second switching device 18-2 is disposed between second power storage device 10-2 and second converter 12-2 to switch an electric connection state between second power storage device 10-2 and second converter 12-2 in accordance with a switching signal SW2 from ECU 8000. More specifically, second switching device 18-2 includes a system relay RY2. When switching signal SW2 is deactivated, system relay RY2 is turned off, and when switching signal SW2 is activated, system relay RY2 is turned on. System relay RY2 is maintained in the on state until predetermined conditions are satisfied while vehicle 100 is running, and is turned off when the predetermined conditions are satisfied.

In the following description, first power storage device 10-1 will be referred to as a "master power source" as well, and second power storage device 10-2 will be referred to as a "slave power source" as well.

First converter 12-1 and second converter 12-2 are connected in parallel to each other to main positive bus line MPL and main negative bus line MNL. First converter 12-1 performs a voltage conversion from/to the master power source to/from main positive bus line MPL and main negative bus line MNL, based on a driving signal PWC1 from ECU 8000. Second converter 12-2 performs a voltage conversion from/to the slave power source to/from main positive bus line MPL and main negative bus line MNL, based on a driving signal PWC2 from ECU 8000.

Figure 2:
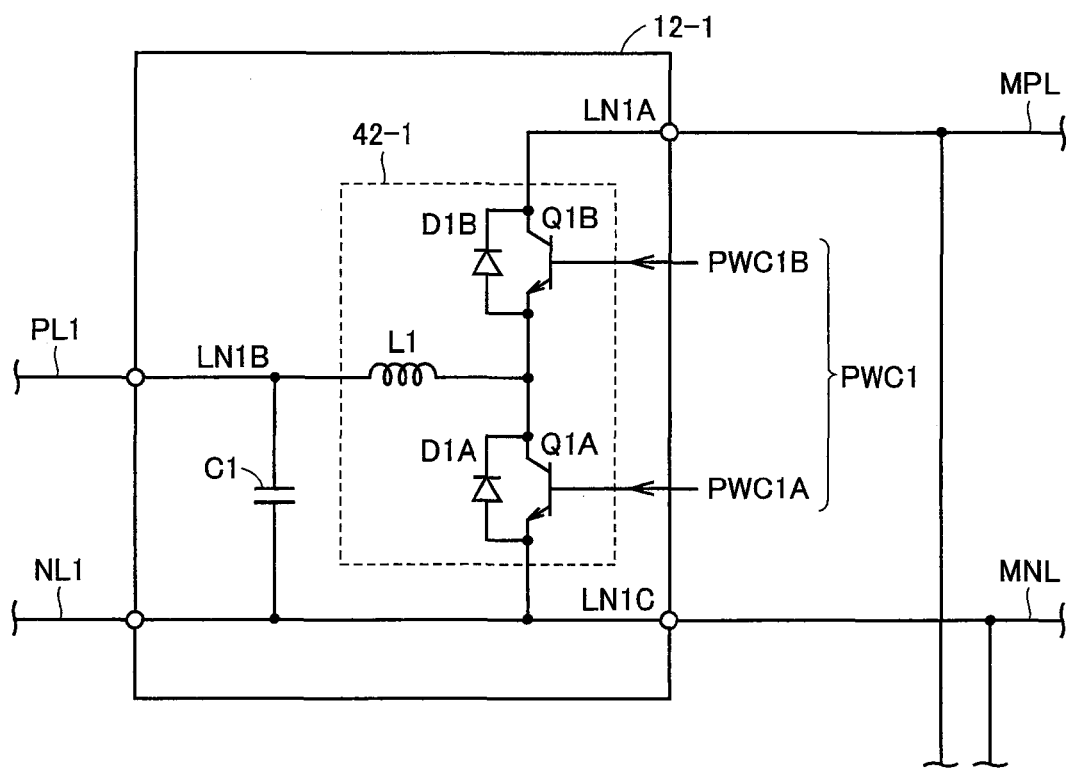
FIG. 2 is a schematic configuration diagram of first and second converters shown in FIG. 1.

FIG. 2 is a schematic configuration diagram of first converter 12-1 and second converter 12-2 shown in FIG. 1. Since the respective converters have similar configuration and operation, the configuration and operation of first converter 12-1 will be described below.

As shown in FIG. 2, first converter 12-1 includes a chopper circuit 42-1, a positive bus line LN1A, a negative bus line LN1C, a line LN1B, and a smoothing capacitor C1. Chopper circuit 42-1 includes switching elements Q1A, Q1B, diodes D1A, D1B, and a reactor L1.

Positive bus line LN1A has one end connected to the collector of switching element Q1B and the other end connected to main positive bus line MPL. Negative bus line LN1C has one end connected to a negative line NL1 and the other end connected to main negative bus line MNL.

Switching elements Q1A and Q1B are connected in series between negative bus line LN1C and positive bus line LN1A. More specifically, switching element Q1A has its emitter connected to negative bus line LN1C, and switching element Q1B has its collector connected to positive bus line LN1A. Diodes D1A and D1B are connected in antiparallel to switching elements Q1A and Q1B, respectively. Reactor L1 is connected between the connection node of switching elements Q1A, Q1B and line LN1B.

Line LN1B has one end connected to a positive electrode line PL1 and the other end connected to reactor L1. Smoothing capacitor C1 is connected between line LN1B and negative bus line LN1C to reduce an AC component contained in a DC voltage across line LN1B and negative bus line LN1C.

Chopper circuit 42-1 performs bidirectional DC voltage conversions from/to the master power source to/from main positive bus line MPL and main negative bus line MNL, in accordance with driving signal PWC1 from ECU 8000. Driving signal PWC1 includes a driving signal PWC1A for controlling the on/off states of switching element Q1A constituting a lower arm element and a driving signal PWC1B for controlling the on/off states of switching element Q1B constituting an upper arm element. ECU 8000 controls a duty ratio (on/off period ratio) of switching elements Q1A and Q1B within a certain duty cycle (the sum of on and off periods).

Controlling the duty ratio of switching elements Q1A and Q1B allows the voltage of main positive bus line MPL to be controlled, and also allows the direction of current (electric power) and the amount of current (amount of electric power) flowing between the master power source and main positive bus line MPL to be controlled.

Stopping the operations of both of switching elements Q1A and Q1B bring both of them into the off state (hereinafter also referred to as a "gate-interrupted state"). In the gate-interrupted state, current flows merely in a direction (hereinafter also referred to as a "discharge direction") from reactor L1 (the master power source side) to main positive bus line MPL (second MG 32-2 side) through diode D1B, and no current flows in a direction (hereinafter also referred to as a "charging direction") from main positive bus line MPL to reactor L1.

Referring back to FIG. 1, smoothing capacitor C is connected between main positive bus line MPL and main negative bus line MNL to reduce power varying components contained in main positive bus line MPL and main negative bus line MNL.

Voltage sensor 20 detects a voltage Vh across main positive bus line MPL and main negative bus line MNL, and outputs the detected value to ECU 8000.

Current sensors 14-1 and 14-2 detect a current Ib1 flowing into/out of the master power source and a current Ib2 flowing into/out of the slave power source, respectively, and output the detected values to ECU 8000. Although FIG. 1 shows the case in which respective current sensors 14-1 and 14-2 detect current of the positive line, respective current sensors 14-1 and 14-2 may detect current of the negative line.

Voltage sensors 16-1 and 16-2 detect a voltage Vb1 of the master power source and a voltage Vb2 of the slave power source, respectively, and output the detected values to ECU 8000.

Temperature sensors 19-1 and 19-2 detect a temperature Tb1 of the master power source and a temperature Tb2 of the slave power source, respectively, and output the detected values to ECU 8000.

ECU 8000 generates driving signals PWC1 and PWC2 for driving first converter 12-1 and second converter 12-2, respectively, driving signals PWIV1 and PWIV2 for driving first inverter 30-1 and second inverter 30-2, respectively, and a control signal PWENG for controlling engine 36, based on the respective detected values from current sensors 14-1, 14-2, voltage sensors 16-1, 16-2, temperature sensors 19-1, 19-2, and vehicle demand power Ps. ECU 8000 then outputs generated driving signals PWC1, PWC2, PWIV1, PWIV2, and control signal PWENG to first converter 12-1, second converter 12-2, first inverter 30-1, second inverter 30-2, and engine 36, respectively.

ECU 8000 calculates a value SOC1 indicative of the state of charge (SOC) of the master power source based on voltage Vb1 and current Ib1 of the master power source. ECU 8000 calculates allowable discharge power (the upper limit value of dischargeable electric power) Wout1 of the master power source based on value SOC1 indicative of the state of charge, temperature Tb1, a continuous discharge time period, and the like of the master power source.

ECU 8000 calculates a value SOC2 indicative of the state of charge of the slave power source based on voltage Vb2 and current Ib2 of the slave power source. ECU 8000 calculates allowable discharge power Wout2 of the slave power source based on value SOC2 indicative of the state of charge, temperature Tb2, a continuous discharge time period, and the like of the slave power source.

ECU 8000 executes running control selected from among electric vehicle running (hereinafter also referred to as "EV running"), hybrid vehicle running (hereinafter also referred to as "HV running") and fail-safe running. Under the HV running control, ECU 8000 causes vehicle 100 to run with motive power of both of engine 36 and second MG 32-2, and under the EV running control, causes vehicle 100 to run with motive power of second MG 32-2 with engine 36 shut down.

In the case of bringing about discharge from power source system 1 to driving-force generating unit 2 under the EV running control and HV running control, ECU 8000 controls the respective inverters such that discharge power of power source system 1 does not exceed the sum of allowable discharge power Wout1 and allowable discharge power Wout2, and also calculates the discharge distribution ratio indicative of the distribution between discharge power W1 and discharge power W2 such that discharge power W1 and W2 of the respective power sources do not exceed allowable discharge power Wout1 and Wout2, respectively, to control the respective converters such that discharge takes place in accordance with the calculated discharge distribution ratio.

ECU 8000 executes fail-safe running control when predetermined conditions are satisfied (for example, when either of values SOC1 and SOC2 indicative of the states of charge of the respective power sources is greater than a predetermined upper limit value, or when abnormality (e.g., failure) of each converter is detected). Under the fail-safe running control, ECU 8000 executes motor drive running (hereinafter also referred to as "MD running") of causing vehicle 100 to run with the both converters brought into the gate-interrupted state and with second MG 32-2 operating merely as a motor while engine 36 and first MG 32-1 are shut down. In the following description, the fail-safe running will be referred to as "MD running in the gate-interrupted state" as well.

The MD running in the gate-interrupted state brings the both converters into the gate-interrupted state so that current flows merely in the discharge direction, and second MG 32-2 functions merely as a motor. Accordingly, discharge takes place merely from power source system 1 to driving-force generating unit 2. At this stage, however, since the converters are both in the gate-interrupted state, the distribution between discharge power W1 and discharge power W2 cannot be controlled. Therefore, executing control similar to that in a normal mode (under the EV running control or the HV running control) where power distribution can be performed may cause the respective power sources to be overdischarged.

The following is a specific explanation taking an example of numeric values. Assume that voltage Vb1 and allowable discharge power Wout1 of the master power source are 280V and 10 kw, respectively, and voltage Vb2 and allowable discharge power Wout2 of the slave power source are 320V and 20 kw, respectively. Then, in a normal mode, it will be possible to control the respective inverters with the upper limit of discharge power of power source system 1 set at 30 kw (=Wout1+Wout2) and to cause the respective converters to control the distribution between discharge power W1 and discharge power W2 such that discharge power W1 and W2 do not exceed 10 kw (=Wout1) and 20 kw (Wout2), respectively. However, since the above-mentioned power distribution cannot be performed during the MD running in the gate-interrupted state, setting the upper limit of discharge power of power source system 1 at 30 kw similarly in the normal mode will cause electric power exceeding 20 kw (=Wout2) to be discharged from the slave power source having a higher voltage, bringing the slave power source into an overdischarged state.

Therefore, according to the present embodiment, a limit value Wout(MD) is set on discharge power of power source system 1 during the MD running in the gate-interrupted state, and a torque target value of second MG 32-2 (hereinafter also referred to as "MG2 torque") such that discharge power of power source system 1 (electric power supplied to second MG 32-2) does not exceed this limit value Wout(MD).

Figure 3:
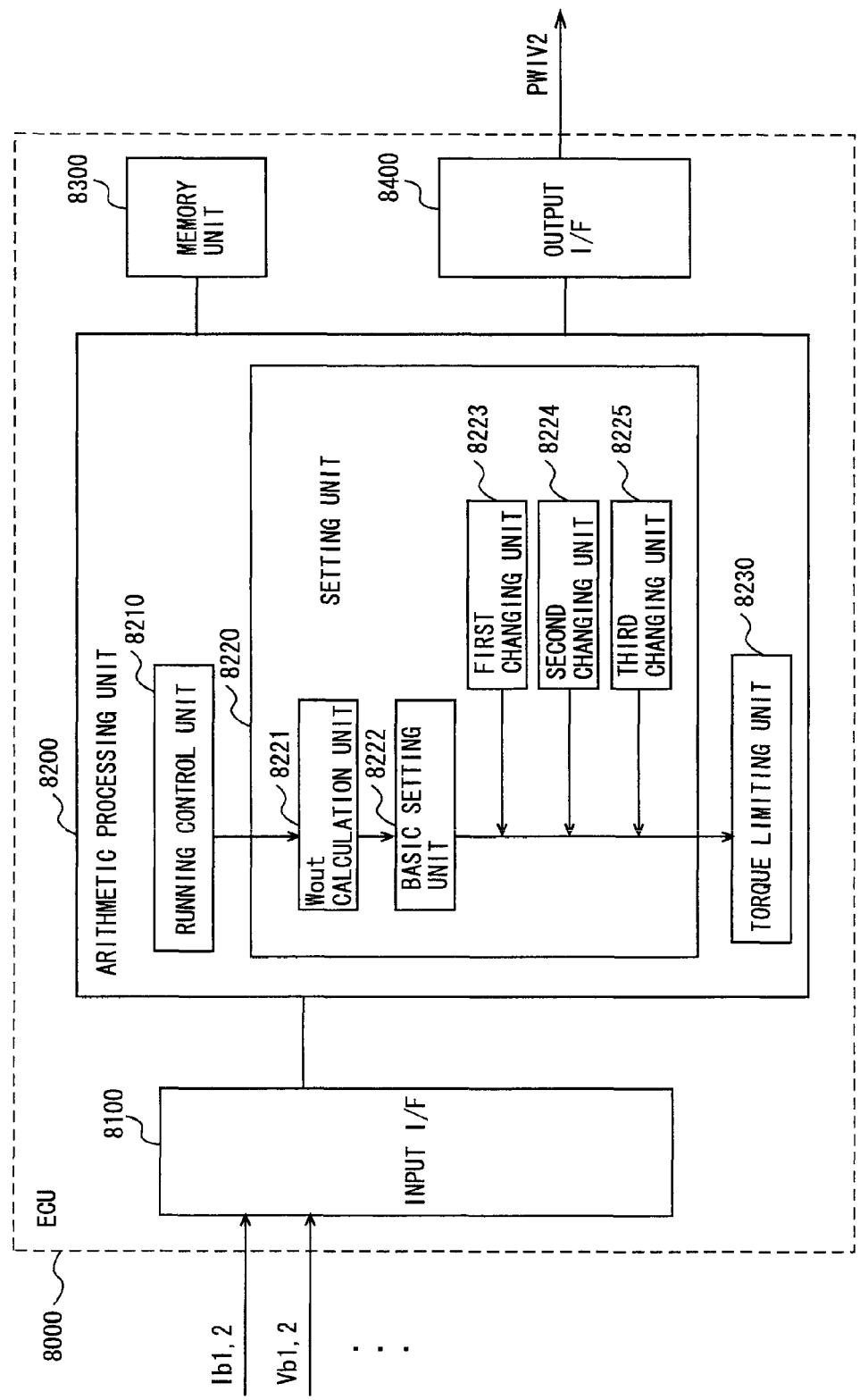
FIG. 3 is a functional block diagram of the control apparatus according to the embodiment of the present invention.

FIG. 3 is a functional block diagram of ECU 8000. ECU 8000 includes an input interface 8100, an arithmetic processing unit 8200, a memory unit 8300, and an output interface 8400.

Input interface 8100 receives detection results from the respective sensors and the like for transmission to arithmetic processing unit 8200.

Memory unit 8300 stores various types of information, programs, threshold values, maps and the like, to which data read out from arithmetic processing unit 8200 is saved according to necessity.

Arithmetic processing unit 8200 includes a running control unit 8210, a setting unit 8220 and a torque limiting unit 8230.

Running control unit 8210 controls respective devices to cause vehicle 100 to run under running control selected from among the EV running, the HV running and the fail-safe running (MD running in the gate-interrupted state). For the MD running in the gate-interrupted state, running control unit 8210 brings the respective converters into the gate-interrupted state, and causes second MG 32-2 to function merely as a motor with engine 36 and first MG 32-1 shut down, as described above.

Setting unit 8220 sets limit value Wout(MD) on discharge power of power source system 1 during the MD running in the gate-interrupted state. Setting unit 8220 includes a basic setting unit 8222, a first changing unit 8223, a second changing unit 8224, and a third changing unit 8225.

When a difference between voltages Vb1 and Vb2 of the respective power sources is large, basic setting unit 8222 selects allowable discharge power Wout corresponding to one of the power sources having a higher voltage as limit value Wout(MD), and otherwise selects a smaller one of allowable discharge power Wout1 and Wout2 as limit value Wout(MD).

First changing unit 8223, second changing unit 8224 and third changing unit 8225 executes a process of changing limit value Wout(MD) set by basic setting unit 8222. Although the following describes that the process is executed by first changing unit 8223, second changing unit 8224 and third changing unit 8225 in the cited order, the process is not limited to such order.

As measures against a misjudgment due to errors in the respective voltage sensors, first changing unit 8223 calculates actual discharge power W1 and W2 of the respective power sources based on voltages and currents of the respective power sources, and when discharge power W1 and W2 exceed allowable discharge power Wout1 and Wout2, respectively, continuously for a certain duration of time, changes limit value Wout(MD) from the value set by basic setting unit 8222 to a smaller one of allowable discharge power Wout1 and Wout2.

As measures for protecting the respective power sources, second changing unit 8224 monitors voltages Vb1 and Vb2 of the respective power sources, and when at least one of Vb1 and Vb2 drops to a voltage value that may degrade each power source, changes limit value Wout(MD) from the value set by basic setting unit 8222 to a smaller one of allowable discharge power Wout1 and Wout2.

Third changing unit 8225 performs a process of monotonously decreasing limit value Wout(MD) for preventing user's unintended acceleration due to hunting of limit value Wout(MD). More specifically, when the value set by basic setting unit 8222 (or first changing unit 8223, second changing unit 8224) of a current cycle is greater than a limit value Wout(MD)n−1 set in a preceding cycle, a limit value Wout (MD) n of the current cycle is changed from the value set by basic setting unit 8222 (or first changing unit 8223, second changing unit 8224) in the current cycle to limit value Wout (MD)n−1 set in the preceding cycle.

Torque limiting unit 8230 generates driving signal PWIV2 for limiting the MG2 torque such that the discharge power of power source system 1 (electric power supplied to second MG 32-2) does not exceed limit value Wout(MD) set by setting unit 8220, for output to second inverter 30-2.

The above-described functions may be implemented by software or hardware. The following description is directed to a case where the above-described functions are implemented by software, more specifically, a case where arithmetic processing unit 8200 executes a program stored in memory unit 8300 so that the above-described functions are implemented.

Figure 4:
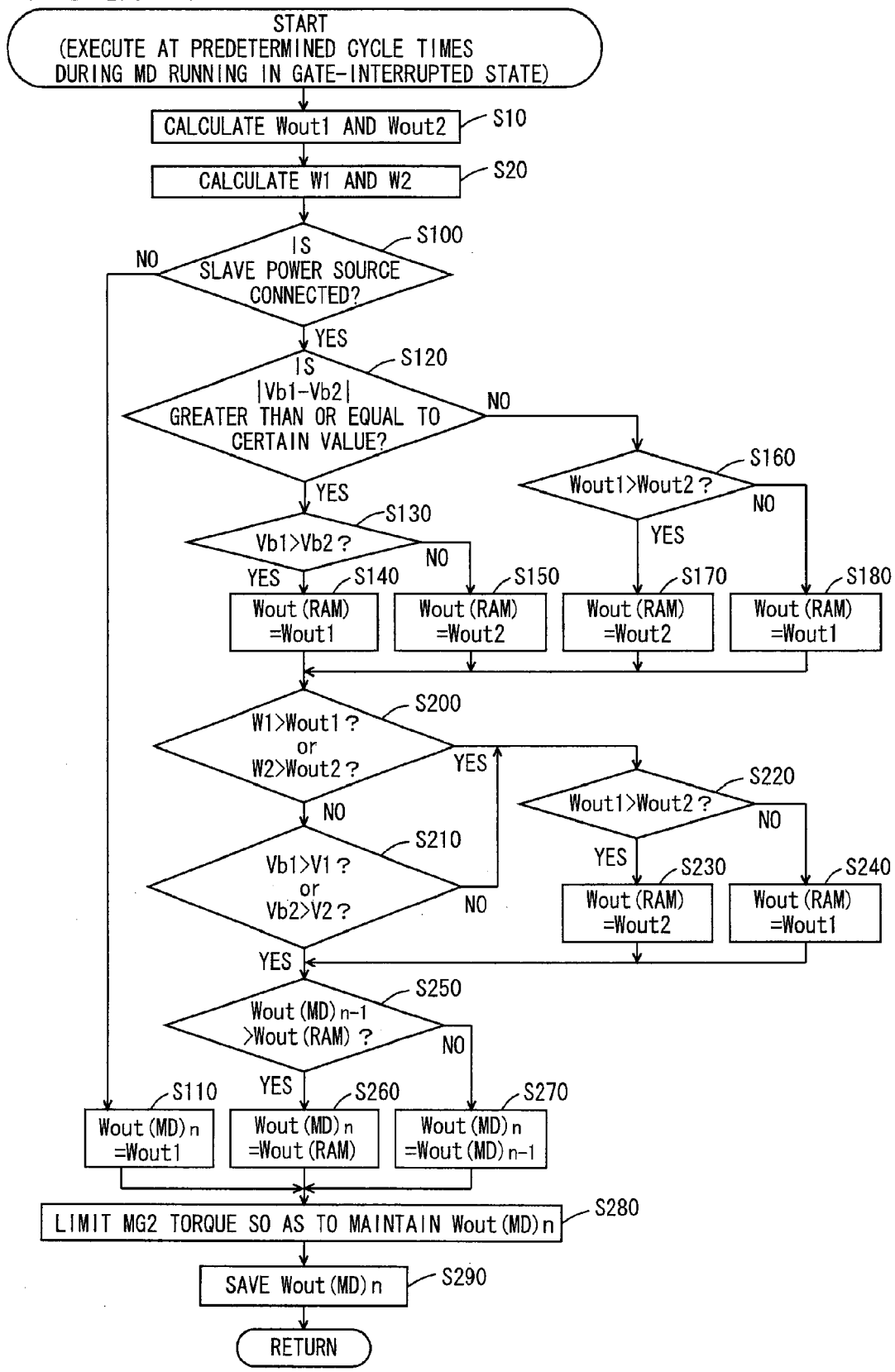
FIG. 4 is a flow chart showing a control structure of the control apparatus according to the embodiment of the present invention.

With reference to FIG. 4, a control structure of the program executed by ECU 8000 will now be described. This program is executed repeatedly at predetermined cycle times during the MD running in the gate-interrupted state (during the fail-safe running).

In step (hereinafter, step will be abbreviated to S) 10, ECU 8000 calculates allowable discharge power Wout1 of the master power source and allowable discharge power Wout2 of the slave power source.

In S20, ECU 8000 calculates actual discharge power W1 of the master power source and actual discharge power W2 of the slave power source based on voltages Vb1, Vb2 (detected values of voltage sensors 16-1 and 16-2) and currents Ib1 and Ib2 (detected values of current sensors 14-1 and 14-2) of the respective power sources.

In S100, ECU 8000 determines whether or not the slave power source and second converter 12-2 are electrically connected (i.e., whether or not system relays RY1 and RY2 are both turned on so that discharge from both of the master power source and the slave power source to second inverter 30-2) can take place. When the slave power source and second converter 12-2 are electrically connected (YES in S100), the process proceeds into S120. Otherwise (NO in S100), the process proceeds into S110.

In S110, ECU 8000 sets limit value Wout(MD)n of the current cycle at allowable discharge power Wout1 of the master power source.

In S120, ECU 8000 determines whether or not an absolute value of the difference between voltage Vb1 of the master power source and voltage Vb2 of the slave power source is greater than or equal to a certain value. When the absolute value of the difference between voltage Vb1 of the master power source and voltage Vb2 of the slave power source is greater than or equal to the certain value (YES in S120), the process proceeds into S130. Otherwise (NO in S120), the process proceeds into S160.

In S130, ECU 8000 determines whether or not voltage Vb1 of the master power source (the detected value of voltage sensor 16-1) is greater than voltage Vb2 of the slave power source (the detected value of voltage sensor 16-2). When voltage Vb1 of the master power source is greater than voltage Vb2 of the slave power source (YES in S130), the process proceeds into S140. Otherwise (NO in S130), the process proceeds into S150.

In S140, ECU 8000 sets a provisional limit value Wout (RAM) at allowable discharge power Wout1 of the master power source. It should be noted that provisional limit value Wout(RAM) is a value temporarily saved to memory unit 8300. The same applies to the following description.

In S150, ECU 8000 sets provisional limit value Wout (RAM) at allowable discharge power Wout2 of the slave power source.

In S160, ECU 8000 determines whether or not allowable discharge power Wout1 of the master power source is greater than allowable discharge power Wout2 of the slave power source. When allowable discharge power Wout1 of the master power source is greater than allowable discharge power Wout2 of the slave power source (YES in S160), the process proceeds into S170. Otherwise (NO in S160), the process proceeds into S180.

In S170, ECU 8000 sets provisional limit value Wout (RAM) at allowable discharge power Wout2 of the slave power source.

In S180, ECU 8000 sets provisional limit value Wout (RAM) at allowable discharge power Wout1 of the master power source.

In S200, ECU 8000 determines whether or not actual discharge power W1 of the master power source exceeds allowable discharge power Wout1 of the master power source continuously for a certain duration of time, or whether or not actual discharge power W2 of the slave power source exceeds allowable discharge power Wout2 of the slave power source continuously for a certain duration of time. When W1 exceeds Wout1 continuously for a certain duration of time or when W2 exceeds Wout2 continuously for a certain duration of time (YES in S200), the process proceeds into S220. Otherwise (NO in S200), the process proceeds into S210.

In S210, ECU 8000 determines whether or not voltage Vb1 of the master power source is greater than a predetermined lower limit value V1, or whether or not voltage Vb2 of the slave power source is greater than a predetermined lower limit value V2. Predetermined lower limit values V1 and V2 are set based on voltage values that may degrade the power sources, respectively. When Vb1 is greater than V1 or when Vb2 is greater than V2 (YES in S210), the process proceeds into S250. Otherwise (NO in S210), the process proceeds into S220.

In S220, ECU 8000 determines whether or not allowable discharge power Wout1 of the master power source is greater than allowable discharge power Wout2 of the slave power source. When allowable discharge power Wout1 of the master power source is greater than allowable discharge power Wout2 of the slave power source (YES in S220), the process proceeds into S230. Otherwise (NO in S220), the process proceeds into S240.

In S230, ECU 8000 changes provisional limit value Wout (RAM) from the value having been set to allowable discharge power Wout2 of the slave power source.

In S240, ECU 8000 changes provisional limit value Wout (RAM) from the value having been set to allowable discharge power Wout1 of the master power source.

In S250, ECU 8000 reads out limit value Wout(MD)n−1 set in the preceding cycle from memory unit 8300 to determine whether or not limit value Wout(MD)n−1 set in the preceding cycle is greater than provisional limit value Wout(RAM). When Wout(MD)n−1 is greater than Wout(RAM)(YES in S250), the process proceeds into S260. Otherwise (NO in S250), the process proceeds into S270.

In S260, ECU 8000 sets limit value Wout(MD)n of the current cycle at provisional limit value Wout(RAM).

In S270, ECU 8000 sets limit value Wout(MD)n of the current cycle at limit value Wout(MD)n−1 set in the preceding cycle.

In S280, ECU 8000 limits the MG2 torque such that discharge power of power source system 1 (electric power supplied to second MG 32-2) does not exceed limit value Wout (MD)n of the current cycle.

In S290, ECU 8000 saves limit value Wout(MD) n of the current cycle to memory unit 8300.

An operation of ECU 8000 according to the present embodiment based on the above-described structure and flow chart will now be described.

In the following, a process to be performed when the master power source and the slave power source are both connected to second inverter 30-2 (YES in S100) during the MD running in the gate-interrupted state will be described in four separate steps: a basic setting step; and first to third changing steps.

[Basic Setting Step]

For example, when voltage Vb2 of the slave power source is greater than voltage Vb1 of the master power source by a certain value or more (YES in S120, NO in S130), ECU 8000 sets provisional limit value Wout(RAM) at allowable discharge power Wout2 of the slave power source having a higher voltage, considering an actual physical phenomenon in which discharge takes place merely from the slave power source (S130, S140, S150).

When not subjected to the first to third changing steps (NO in S200, YES in S210, YES in S250) which will be described later, limit value Wout(MD)n of the current cycle is set at allowable discharge power Wout2 of the slave power source having a higher voltage (S260).

Discharge power W1 and W2 of the respective power sources are thereby controlled so as not to exceed allowable discharge power Wout1 and Wout2, respectively, which can prevent the respective power sources from being overdischarged. Further, setting limit value Wout(MD)n at allowable discharge power Wout2 of the slave power source even when allowable discharge power Wout2 of the slave power source is greater than allowable discharge power Wout1 of the master power source can prevent the MG2 torque from being unnecessarily limited.

When the difference between voltage Vb1 of the master power source and voltage Vb2 of the slave power source is smaller than the certain value (NO in S120), ECU 8000 sets limit value Wout(MD) at a smaller one of allowable discharge power Wout1 and Wout2, considering an actual physical phenomenon in which discharge takes place from both of the power sources (S160, S170, S180, S260). Discharge power W1 and W2 of the respective power sources are thereby controlled so as not to exceed at least allowable discharge power Wout1 and Wout2, respectively, which prevents the respective power sources from being overdischarged.

[First Changing Step; Step as Measures Against Misjudgment Due to Errors in Respective Voltage Sensors]

As described above, in the basic setting step, the levels of voltages of the respective power sources may be determined merely based on the detected values of the respective voltage sensors (S130), and provisional limit value Wout(RAM) may be set at allowable discharge power Wout of one of the power sources having a higher voltage. However, there may be a case in which, when the respective voltage sensors have great errors, a misjudgment occurs that the voltage levels of the respective power sources are determined contrary to actual levels, and setting limit value Wout(MD) at provisional limit value Wout(RAM) selected in the basic setting step without change causes the respective power sources to be overdischarged.

Assume that Wout1 is 15 kw and Wout2 is 5 kw, for example. Then, when errors in the respective voltage sensors cause a misjudgment that Vb1>Vb2 holds although Vb1<Vb2 actually holds, provisional limit value Wout (RAM) will be set at 15 kw (=Wout1). When limit value Wout(MD) is set at this 15 kw without change, electric power of 15 kw (>Wout2) will be discharged from the slave power source, causing the slave power source to be overdischarged.

Accordingly, ECU 8000 calculates actual discharge power W1 and W2 of the respective power sources (S20) based on voltages Vb1, Vb2 (the detected values of voltage sensors 16-1 and 16-2) and currents Ib1 and Ib2 (the detected values of current sensors 14-1 and 14-2) of the respective power sources, and when calculated discharge power W1 and W2 exceed allowable discharge power Wout1 and Wout2, respectively, continuously for a certain duration of time (YES in S200), provisional limit value Wout(RAM) is changed from the value set in the basic setting step to a smaller one of allowable discharge power Wout1 and Wout2 (5 kw in the above-described example) (S220, S230, S240).

This allows appropriate control such that discharge power W1 and W2 of the respective power sources do not exceed allowable discharge power Wout1 and Wout2, respectively, even when a misjudgment due to errors in the respective voltage sensors occurs, which prevents the respective power sources from being overdischarged.

[Second Changing Step; Step as Measures for Protecting Respective Power Sources]

When at least one of Vb1 and Vb2 drops to lower limit value V1, V2 set based on a voltage value that may degrade each power source, ECU 8000 changes provisional limit value Wout(RAM) from the value set in the basic setting step to a smaller one of allowable discharge power Wout1 and Wout2 as measures for protecting the respective power sources (S220, S230, S240). This can prevent degradation of the respective power sources due to voltage drops.

[Third Changing Step; Step for Preventing User's Unintended Acceleration]

When limit value Wout(MD) is changed from Wout1 to Wout2 (or from Wout2 to Wout1) in the above-described basic setting step, first changing step and second changing step, the range in which the MG2 torque varies is extended as the difference between Wout1 and Wout2 is enlarged. Assuming that Wout1 is 15 kw and Wout2 is 5 kw, for example, limit value Wout(MD) may be significantly increased from 5 kw to 15 kw even when a user operates the acceleration pedal constantly, resulting in user's unintended acceleration.

Further, when the judgment as to which allowable discharge power Wout is to be selected in each step is difficult, hunting will occur in which limit value Wout(MD) is changed frequently between Wout1 and Wout2, resulting in frequent user's unintended acceleration (or deceleration).

Therefore, when limit value Wout(MD)n−1 set in the preceding cycle is smaller than provisional limit value Wout (RAM) set in the current cycle (NO in S250), ECU 8000 sets limit value Wout(MD)n of the current cycle at limit value Wout(MD)n−1 set in the preceding cycle (S270).

Accordingly, after setting limit value Wout(MD) at 5 kw, for example, then, when provisional limit value Wout(RAM) is set at a value greater than 5 kw, limit value Wout(MD) is not set at that provisional limit value Wout(RAM), and limit value Wout(MD) is decreased monotonously. This can prevent hunting of limit value Wout(MD), and also appropriately suppress user's unintended acceleration.

As described above, with the control apparatus according to the present embodiment, when the voltage difference between the respective power sources is greater than or equal to a certain value during the motor drive running in the gate-interrupted state (during the fail-safe running) in which the distribution of discharge power of the master power source and discharge power of the slave power source cannot be controlled, limit value Wout(MD) is set at allowable discharge power of one of the power sources having a higher voltage, and the motor torque is controlled such that electric power discharged from the power source system to the motor does not exceed limit value Wout(MD). This can prevent the motor torque from being unnecessarily limited, and also prevent the respective power sources from being overdischarged.

It should be construed that embodiments disclosed herein are by way of illustration in all respects, not by way of limitation. It is intended that the scope of the present invention is defined by claims, not by the description above, and includes all modifications equivalent in meaning and scope to the claims.

The invention claimed is:

1. A control apparatus for a vehicle equipped with a load consuming electric power and with a first power source and a second power source, each being electrically connected in parallel to said load, comprising:
   a setting unit for setting a limit value on electric power supplied to said load based on a state of said first power source and a state of said second power source; and
   a limiting unit for limiting the electric power supplied to said load in accordance with said limit value,
   said setting unit including:
      a calculation unit for calculating a first upper limit value of electric power which is dischargeable from said first power source based on the state of said first power source and calculating a second upper limit value of electric power which is dischargeable from said second power source based on the state of said second power source; and
      a basic setting unit for selecting an upper limit value corresponding to one of said first power source and said second power source having a higher output voltage when a difference between output voltages of said first power source and said second power source is greater than a predetermined value, and selecting a smaller one of said first upper limit value and said second upper limit value when said difference between the output voltages is smaller than the predetermined value, thereby setting said limit value.

2. The control apparatus for a vehicle according to claim 1, wherein said setting unit further includes a changing unit for selecting said limit value at a first time point in place of the upper limit value selected by said basic setting unit at a second time point later than said first time point, when the upper limit value selected by said basic setting unit at said second time point is greater than said limit value at said first time point, thereby setting said limit value at said second time point.

3. The control apparatus for a vehicle according to claim 1, wherein said setting unit further includes a changing unit for selecting a smaller one of said first upper limit value and said second upper limit value in place of the upper limit value selected by said basic setting unit, when discharge power of said first power source exceeds said first upper limit value continuously for a certain duration of time or when discharge power of said second power source exceeds said second upper limit value continuously for the certain duration of time, thereby setting said limit value.

4. The control apparatus for a vehicle according to claim 1, wherein said setting unit further includes a changing unit for selecting a smaller one of said first upper limit value and said second upper limit value in place of the upper limit value selected by said basic setting unit, when the output voltage of said first power source drops below a first predetermined value or when the output voltage of said second power source drops below a second predetermined value, thereby setting said limit value.

5. The control apparatus for a vehicle according to claim 1, wherein
   said load includes a rotating electric machine,
   said vehicle is equipped with:
      a first converter disposed between said rotating electric machine and said first power source and controlled to take one of an operating state of performing a voltage conversion between said rotating electric machine and said first power source and a shutdown state of flowing current merely in a direction from said first power source to said rotating electric machine without performing the voltage conversion;
      a second converter disposed between said rotating electric machine and said second power source and controlled to take one of the operating state of performing the voltage conversion between said rotating electric machine and said second power source and the shutdown state of flowing current merely in a direction from said second power source to said rotating electric machine without performing the voltage conversion; and
      an inverter disposed among said first converter, said second converter and said rotating electric machine, for controlling said rotating electric machine, said control apparatus further comprising a running control unit for, when a predetermined condition is satisfied, executing discharge running control of causing said vehicle to run by controlling said first converter and said second converter to take said shutdown state and by controlling said inverter such that said rotating electric machine operates as a motor without operating as a generator, wherein when said discharge running control is executed, said setting unit sets said limit value, and when said discharge running control is executed, said limiting unit limits an output torque of said rotating electric machine such that electric power supplied to said rotating electric machine does not exceed said limit value.

6. A control apparatus for a vehicle equipped with a rotating electric machine and with a first power source and a second power source, each being electrically connected in parallel to said rotating electric machine, said vehicle being equipped with a first converter for performing a voltage conversion between said rotating electric machine and said first power source, a second converter for performing the voltage conversion between said rotating electric machine and said second power source, and an inverter disposed among said first converter, said second converter and said rotating electric machine, for controlling said rotating electric machine, said first converter and said second converter, in a shutdown state, flowing current merely in discharge directions from said first power source and said second power source to said rotating electric machine respectively, said control apparatus comprising:

a running control unit for, when a predetermined condition is satisfied, executing discharge running control of causing said vehicle to run by controlling said first converter and said second converter to take said shutdown state and by controlling said inverter such that said rotating electric machine operates as a motor without operating as a generator;

a setting unit for, when said discharge running control is executed, setting a limit value on electric power supplied to said rotating electric machine based on a state of said first power source and a state of said second power source; and a torque limiting unit for, when said discharge running control is executed, limiting an output torque of said rotating electric machine such that electric power supplied to said rotating electric machine does not exceed said limit value, said setting unit including:

a calculation unit for calculating a first upper limit value of electric power which is dischargeable from said first power source based on the state of said first power source and calculating a second upper limit value of electric power which is dischargeable from said second power source based on the state of said second power source;

a basic setting unit for selecting an upper limit value corresponding to one of said first power source and said second power source having a higher output voltage, when a difference between output voltages of said first power source and said second power source is greater than a predetermined value, and selecting a smaller one of said first upper limit value and said second upper limit value when said difference between the output voltages is smaller than the predetermined value, thereby setting said limit value;

a first changing unit for selecting a smaller one of said first upper limit value and said second upper limit value in place of the upper limit value selected by said basic setting unit, when discharge power of said first power source exceeds said first upper limit value continuously for a certain duration of time or when discharge power of said second power source exceeds said second upper limit value continuously for the certain duration of time, thereby setting said limit value;

a second changing unit for selecting a smaller one of said first upper limit value and said second upper limit value in place of the upper limit value selected by said basic setting unit, when the output voltage of said first power source drops below a first predetermined value or when the output voltage of said second power source drops below a second predetermined value, thereby setting said limit value; and a third changing unit for selecting said limit value at a first time point in place of the upper limit value selected at a second time point later than said first time point, when the upper limit value selected at said second time point by one of said basic setting unit, said first changing unit and said second changing unit is greater than said limit value set at said first time point, thereby setting said limit value at said second time point.

7. A control method to be executed by a control apparatus for a vehicle equipped with a load consuming electric power and with a first power source and a second power source, each being electrically connected in parallel to said load, including the steps of:

setting a limit value on electric power supplied to said load based on a state of said first power source and a state of said second power source; and limiting the electric power supplied to said load in accordance with said limit value, the step of setting said limit value including the steps of:

calculating a first upper limit value of electric power which is dischargeable from said first power source based on the state of said first power source and calculating a second upper limit value of electric power which is dischargeable from said second power source based on the state of said second power source; and selecting an upper limit value corresponding to one of said first power source and said second power source having a higher output voltage when a difference between output voltages of said first power source and said second power source is greater than a predetermined value, and selecting a smaller one of said first upper limit value and said second upper limit value when said difference between the output voltages is smaller than the predetermined value, thereby setting said limit value.

8. A control method to be executed by a control apparatus for a vehicle equipped with a rotating electric machine and with a first power source and a second power source, each being electrically connected in parallel to said rotating electric machine said vehicle being equipped with a first converter for performing a voltage conversion between said rotating electric machine and said first power source, a second converter for performing the voltage conversion between said rotating electric machine and said second power source, and an inverter disposed among said first converter, said second converter and said rotating electric machine, for controlling said rotating electric machine, said first converter and said second converter, in a shutdown state, flowing current merely in discharge directions from said first power source and said second power source to said rotating electric machine, respectively, said control method including the steps of:

when a predetermined condition is satisfied, executing discharge running control of causing said vehicle to run by controlling said first converter and said second converter to take said shutdown state and by controlling said inverter such that said rotating electric machine operates as a motor without operating as a generator;

when said discharge running control is executed, setting a limit value on electric power supplied to said rotating electric machine based on a state of said first power source and a state of said second power source; and when said discharge running control is executed, limiting an output torque of said rotating electric machine such that electric power supplied to said rotating electric machine does not exceed said limit value, the step of setting said limit value including the steps of:

calculating a first upper limit value of electric power which is dischargeable from said first power source based on the state of said first power source and calculating a second upper limit value of electric power which is dischargeable from said second power source based on the state of said second power source;

selecting an upper limit value corresponding to one of said first power source and said second power source having a higher output voltage when a difference between output voltages of said first power source and said second power source is greater than a predetermined value, and selecting a smaller one of said first upper limit value and said second upper limit value as a basic value when said difference between the output voltages is smaller than the predetermined value, thereby setting said limit value;

changing said basic value to a first change value which is a smaller one of said first upper limit value and said second upper limit value, when discharge power of said first power source exceeds said first upper limit value continuously for a certain duration of time or when discharge power of said second power source exceeds said second upper limit value continuously for the certain duration of time, thereby setting said limit value;

changing said basic value to a second change value which is a smaller one of said first upper limit value and said second upper limit value, when the output voltage of said first power source drops below a first predetermined value or when the output voltage of said second power source drops below a second predetermined value, thereby setting said limit value; and selecting said limit value at a first time point as said limit value at a second time point later than said first time point, when one of said basic value, said first change value and said second change value at said second time point is greater than said limit value set at said first time point, thereby setting said limit value at said second time point.

* * * * *